United States Patent
Noto et al.

(10) Patent No.: US 12,093,136 B2
(45) Date of Patent: Sep. 17, 2024

(54) COLD TIERING MICROSERVICE FOR DEDUPLICATED DATA

(71) Applicant: EMC IP Holding Company LLC, Hopkinton, MA (US)

(72) Inventors: Nicholas A. Noto, Sunnyvale, CA (US); Tipper Truong, San Jose, CA (US); Philip N. Shilane, Newtown, PA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 128 days.

(21) Appl. No.: 16/880,216

(22) Filed: May 21, 2020

(65) Prior Publication Data

US 2021/0365326 A1 Nov. 25, 2021

(51) Int. Cl.
*G06F 16/00* (2019.01)
*G06F 11/14* (2006.01)
*G06F 16/215* (2019.01)

(52) U.S. Cl.
CPC ...... *G06F 11/1453* (2013.01); *G06F 11/1469* (2013.01); *G06F 16/215* (2019.01); *G06F 2201/84* (2013.01)

(58) Field of Classification Search
CPC ............. G06F 11/1453; G06F 11/1469; G06F 16/215; G06F 2201/84
See application file for complete search history.

(56) References Cited

U.S. PATENT DOCUMENTS

| | | | | |
|---|---|---|---|---|
| 10,216,754 | B1* | 2/2019 | Douglis | G06F 16/1744 |
| 2010/0274983 | A1* | 10/2010 | Murphy | G06F 11/1448 |
| | | | | 711/162 |
| 2015/0134626 | A1* | 5/2015 | Theimer | G06F 11/3055 |
| | | | | 707/693 |
| 2017/0199894 | A1* | 7/2017 | Aronovich | G06F 16/1752 |
| 2018/0285263 | A1* | 10/2018 | Ghazaleh | G06F 3/0611 |
| 2019/0243547 | A1* | 8/2019 | Duggal | G06F 3/0619 |
| 2019/0317776 | A1* | 10/2019 | Walsh | G06N 20/00 |
| 2020/0371704 | A1* | 11/2020 | Singh | G06F 12/0253 |

* cited by examiner

*Primary Examiner* — Tyler J Torgrimson
(74) *Attorney, Agent, or Firm* — Workman Nydegger (57) ABSTRACT

One example method includes identifying objects that each include one or more segments to be transferred from a source storage tier to a target storage tier, determining a total amount of data to be transferred, using a tiering controller to create worker nodes operable to transfer the segments to the target storage tier, where a number of worker nodes created is based on the amount of data, transferring, from the source storage tier to the target storage tier, only those segments of the objects not already present in the target storage tier, and the transferring of the segments is performed by the worker nodes, and for each of the objects, placing metadata associated with that object in a bucket.

12 Claims, 4 Drawing Sheets

COLD TIERING MICROSERVICE FOR DEDUPLICATED DATA

FIELD OF THE INVENTION

Embodiments of the present invention generally relate to tiering of data in a storage environment. More particularly, at least some embodiments of the invention relate to systems, hardware, software, computer-readable media, and methods for implementing and using a controller and worker architecture for transferring data segments to the appropriate tier while minimizing duplicate segments and memory requirements during the transfer process.

BACKGROUND

Storage systems such as cloud datacenters may charge clients to store their data based on considerations such as the amount of data stored, and the frequency with which the stored data will be accessed. For example, some customers may have data that is only infrequently accessed, possibly only on a monthly or even yearly basis. Such customers may benefit from storing their data in relatively low-cost archival storage that provides relatively slow access to storage data. Other customers, however, may have throughput intensive applications that require high performance storage options which may provide relatively fast access to stored data. Thus, data tiering approaches have been developed that can position customer data in particular storage types, or tiers, based on the particular needs of the customer with respect to their data. In this way, customers pay only for the storage that they actually need and use.

While the data tiering storage model has generally proved useful, some problems remain. For example, some conventional data tiering approaches may involve significant data duplication. Further, the amounts of data involved may impose substantial memory and processing requirements to transfer data between tiers.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data backup and restore processes. More particularly, at least some embodiments of the invention relate to systems, hardware, software, computer-readable media, and methods for implementing and using a controller and worker architecture, as part of a tiering microservice, for transferring data segments to the appropriate tier while minimizing duplicate segments and memory requirements during the transfer process. Embodiments of the invention may employ microservices that may scale the resources needed to complete tiering tasks. Any microservice may be implemented in a corresponding pod. Such embodiments may be efficient with respect to object storage I/O, inasmuch as such embodiments may load the names of data structure in memory and may determine which groups can be read together from object storage. In this way, memory requirements may be reduced, and in some embodiments, objects may be read, at most, once from object storage. Correspondingly, embodiments of the invention may determine which data segments need to be transferred, and may maintain metadata in an active tier for fast access to data stored in a cold tier.

In more detail, example embodiments may embrace a tiering microservice that may offer customers a range of cost/performance tradeoffs. For example, customers may decide to move their objects to a slower, less expensive tier. As such, example embodiments of the invention embrace a controller and worker architecture for transferring segments to the appropriate tier while minimizing duplicate segments and memory requirements during transfer. After customers select objects to transfer, such as by way of a selection API or through a policy, the controller microservice may start and analyze the amount of data to be transferred. The controller microservice may then create workers and assign data tiering tasks to each worker to determine which segments should be transferred, and how to update object metadata. Such an approach may be applied, for example, to deduplicated object storage systems, although it is not limited to use with such storage systems. By transferring only segments that do not exist at the destination, embodiments of the invention may thereby implement deduplication with respect to the data.

The assignment of data tiering tasks may be based on an estimate of the number of workers needed and the data tiering option the customer selects. Customers could select to transfer their data to cheaper, or more expensive, tiers that provide slower or faster accesses, respectively. At least some particular embodiments are with the transfer of data to relatively less expensive tiers, although the scope of the invention is not so limited. Thus, embodiments of a tiering microservice may operate to move the necessary data structures to the desired tier with as little data movement and redundancy as possible.

It is noted that the estimation of the number of workers that may be needed may be accomplished in various ways depending, for example, on the preference of a user of cost-efficiency vs time-efficiency. If cost efficiency is the higher priority, estimation may be accomplished by estimating the memory needed to accomplish the task and comparing that with the memory allocated to each node or machine the workers will run on to determine how many workers are needed. If time-efficiency is the higher priority, estimation may be accomplished by estimating the IO operations needed to perform the task and comparing that with the IO capabilities of the worker machines and how quickly the user would like to accomplish the task to determine how many workers to use.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that data movement between tiers is minimized to the extent possible. An embodiment of the invention may minimize the amount of data that is duplicated in connection with tiering operations. An embodiment of the invention may provide for an active tier that includes metadata relating to data stored in a cold tier so that a customer wishing to read cold tier data may quickly list the objects stored in the cold tier. The use of a cold tier metadata bucket in the active tier may also reduce read costs, since the metadata stored in the cold tier bucket may be accessed more quickly than if it were actually stored in the cold tier. An embodiment of the invention may reduce the duplication of data by placing segments necessary to represent transferred objects in the desired tier, without creating duplicate segments in that tier. An embodiment of the invention may eliminate the need to read similarity groups and compression regions repeatedly.

A. Aspects of An Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data transfer operations, including data tiering operations. Such operations may include, but are not limited to, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, cloud storage services in DellEMC, Microsoft Azure (such as Cool/Archival Storage), Amazon Web Services, Amazon Glacier, Deep Archive, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

Embodiments of the invention may be implemented in connection with a container-orchestration system for automating application deployment, scaling, and management. Such systems may provide one or more microservices for performing various tasks, including tasks related to data tiering. One example of such a system is the open-source Kubernetes platform, although other systems of comparable functionality may alternatively be employed.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Aspects of Example Container and Object Data Structure

Figure 1:
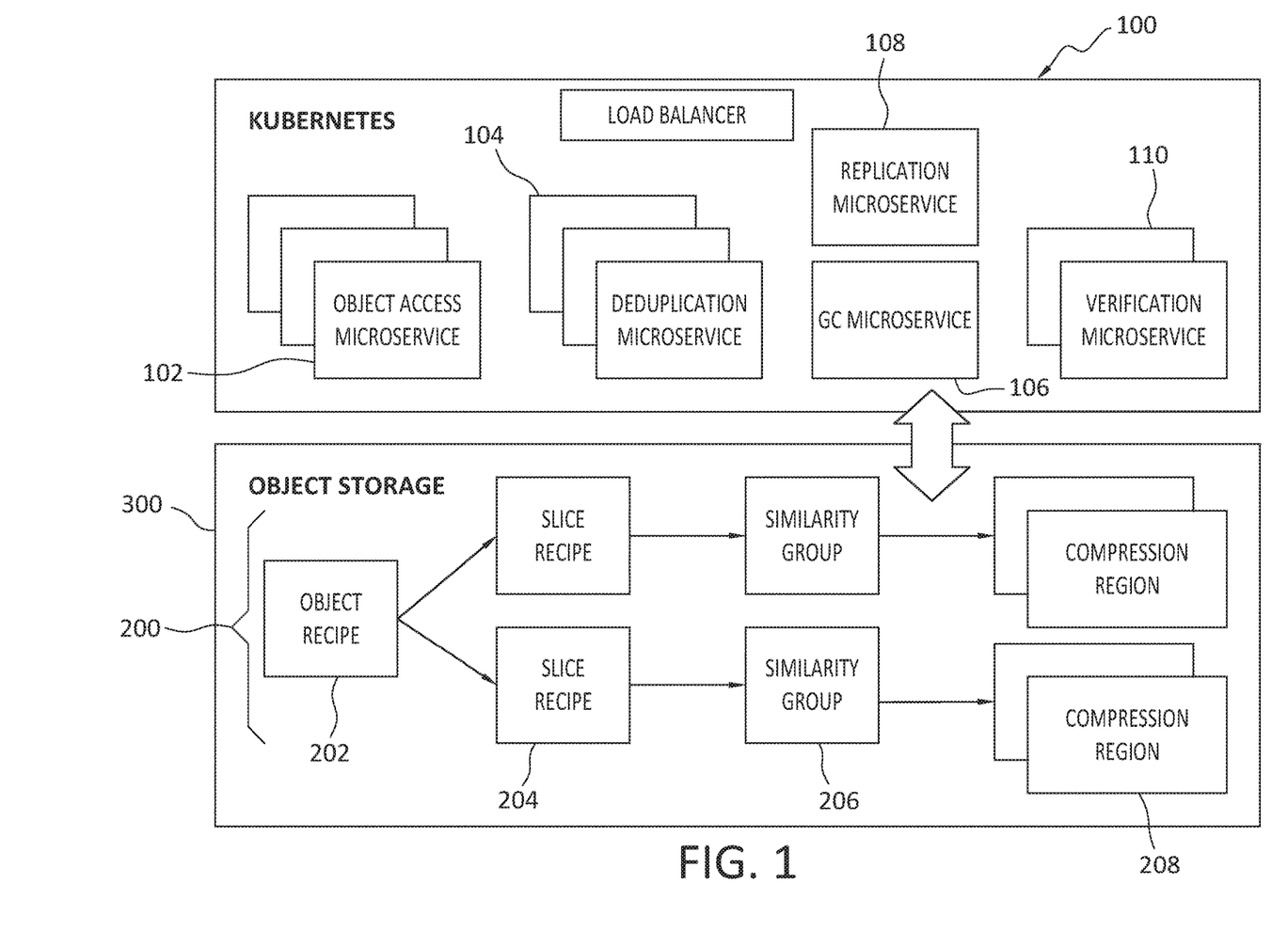
FIG. 1 discloses aspects of an example operating environment and data structures, specifically, an example of a deduplicated storage system and object storage in a cloud environment.

With attention now to FIG. 1, details are provided concerning an example container orchestration environment 100 and object data structure 200 that may be employed in an object storage environment 300, in connection with which embodiments of the invention may be implemented. It is noted with respect to the object data structure 200 that the data structures, that is, object recipes, slice recipes, similarity groups, and compression regions, are represented by one object each in the object storage, and are separate from each other. The example container orchestration environment 100, which may take the form of the Kubernetes platform in some embodiments, may contain various scalable microservices running within Kubernetes in a cloud environment. Such microservices may include, by way of example, object access microservices 102 to provide basic access to buckets and objects, deduplication microservices 104 for deduplication of written objects, a garbage collection microservice 106, a replication microservice 108, and a verification microservice 110. One, some, or all, of the aforementioned microservices may be deployed and used in a deduplicated object storage system that can run in multiple public and private cloud environments.

The example data tiering approaches disclosed herein may employ various different data structures, examples of which are disclosed in FIG. 1. In some embodiments, all persistent data is stored in the underlying object storage system 300 that may provide highly reliable storage with parallel access. When a client stores an object, that object may be represented within the object storage system 300 at the top level with an object recipe 202. An ingested object may be split up at the storage site into multiple portions, or slices. The slice boundaries may be defined based on the content of the object. Each slice, in turn, may be subdivided into segments.

Correspondingly, an object recipe 202, which may include the name assigned by the customer to the object, is used to represent the object and thus may reference one or more slice recipes 204, which, in some embodiments, may span 8 MB of data of the object. Thus, for example, an 8 MB slice may include 1000 8 KB segments. Note that the slices and segments can be of any size and, as such, an 8 MB slice and 8 KB segment are presented only by way of example.

Because each slice may be divided into segments, a slice recipe for one of the slices refers to the segments in that slice. Particularly, the slice recipe may include a reference to each segment, where a segment reference may include information such as SHA1 hash value for the segment, and the segment size, for example. Other slice recipes may span more, or less, data of the object. The segment references may, more generally, include any fingerprint that is generated based on, and uniquely identifies, an associated segment. Thus, reference to a SHA1 hash is provided only by way of example, and not limitation. Thus, a slice recipe may, for example, include 1000 fingerprints, as well as respective size information for each of the 1000 segments.

With continued reference to FIG. 1, each slice recipe 204 may be uniquely mapped to a similarity group 206 which, in turn, may reference one or more compression regions 208. In some embodiments, the compression regions 208 may comprise, or consist of, 8 MB of 8 KB segments compressed together. Each compression region 208 may only be referenced from a single similarity group 206.

A similarity group 206 may manage a number of fingerprints, each of which corresponds to a particular segment of a slice. Thus, for example, a deduplication process may compare the fingerprints in a slice recipe with fingerprints in a similarity group to determine what segment(s), if any, of the slice can be deduplicated.

C. Brief Introduction to Aspects of Some Example Embodiments

With regard to example tiering processes disclosed herein, in which objects may be moved among multiple tiers with various costs and properties, reference may be made to moving objects between active and cold tiers. As used herein, an active tier embraces, but is not limited to, high performance storage options which may provide relatively fast access to stored data. On the other hand, as used herein, a cold tier embraces, but is not limited to, relatively low-cost archival storage that provides relatively slow access to storage data. In general, cold tier storage may be slower and/or less expensive than active tier storage.

To illustrate, a customer may need to select which objects should be transferred from an active tier to a cold tier. Customers may select objects to be moved with an API provided by the storage site, and such selection may be performed on one or more different bases. For example, a customer may select objects that match a prefix string. As another example, a customer may select objects that are managed with an age-based policy. In still another example, a customer may select objects that have not been read during certain time periods, and/or have not been read for a certain period of time, such as a month for example. In a case where a customer selects an object based on the age of that object, a 'cronjob,' that is, a time based scheduler and/or monitoring job, may be launched periodically to check data in the active tier and check the lifecycle configurations of that data. Such a 'cronjob' may take the form, for example, of a Kubernetes cronjob which launches a controller and worker job. The controller and worker job may then generate a controller pod and also generate multiple worker pods, depending on the number of workers we need per workload. Once the controller and worker pods complete their data tiering tasks, the controller and worker job may track the successful completion of the pods. Depending on the configurations of the Kubernetes cronjob and Kubernetes controller and worker job, the controller and worker job may generate controller and worker pods that will run data tiering tasks periodically.

After a customer has selected the object(s) to transfer, the customer may be given the choice of where to transfer their data. It is noted that customer input received in connection with the operation of one or more of the disclosed embodiments may be received by way of a user interface (UI), which may be graphical in nature, or may take the form of a command line interface (CLI), or an API call, for example.

Any type and number of tiers may be employed in various embodiments of the invention. At least some embodiments involve the use of what is referred to herein as ECO_TIER, which refers to relatively less expensive storage that is relatively slower to access for read and write operations. Examples of ECO_TIER storage include Amazon Glacier, and Deep Archive. If, for example, a customer selects the ECO_TIER, a tiering microservice may move data from the active tier to a cold tier, that is, to the ECO_TIER. In contrast, embodiments of the invention may use object storage or block storage as an active tier.

In some embodiments at least, block storage may be employed for the active tier for customer data. Such block storage may be provided, for example, by a cloud provider. To illustrate, one embodiment may employ, as an active tier, block storage on Amazon Web Services (AWS) such as Amazon Elastic Block Storage. For the cold tier in this example embodiment, the cloud provider cold storage may be used. Thus, in this example embodiment, both the active storage tier and the cold storage tier are provided by the same entity, namely, the cloud storage provider. In other embodiments, the active storage tier and the cold storage tier may be provided by different respective entities. Further, alternative active and/or cold tiers may be employed in other embodiments.

In general, when moving objects from an active tier to cold storage, at least some embodiments of the invention involve moving the vast majority, possibly >90% or >95% for example, of customer bytes to the desired tier, while at the same time preserving the metadata of the transferred bytes that may be necessary to interact with the associated objects rapidly in the future. In more detail, the metadata associated with the objects and/or bytes that are tiered to cold storage may be maintained in a bucket in the active tier, where the active tier may take the form of block storage, or object storage. The bucket may be a customer-specific bucket. Example buckets may additionally, or alternatively, be specific to a particular application. Information about the compression region of transferred segments may be stored in the cold tier in this example embodiment.

After a customer has selected their storage option, and if the customer is interested in reading their objects or other data in the cold tier, the customer may be able to list their objects quickly since the metadata for the cold tier data is in a bucket in the active tier. As noted elsewhere herein, such listing operations may be performed quickly due to the fact that active tier storage may provide fast responses to customer operations, and the fact that only the metadata for cold tier objects, but not the cold tier data, is stored in the active tier.

In some embodiments, the active tier, which may comprise object storage for example, may include two buckets, namely, an 'active' bucket and a 'cold' bucket. The active bucket may store a copy of objects that are in active tier, while the cold bucket may store a copy of metadata of the objects that are stored in the cold tier. Since reads may be relatively more expensive or take longer to process in the cold tier than in the active tier, having a cold bucket in the active tier object storage may help to avoid making expensive reads directly to cold tier storage to process metadata related to the cold tier data.

It is noted that while reference is made herein to transferring an object between tiers, it may not always be the case that an entire object is transferred. For example, some segments of the object may already exist in the target storage tier. As such, only the segments of the object that do not already exist in the target storage tier may be transferred from the source tier. Thus, while reference is made herein to transferring objects between tiers, it should be understood that transfer of 'an object' may be the transferring an entire object, the transferring of only a single segment of an object, or the transferring of any number of segments that is greater than one segment but less than the all the segments in the entire object. Moreover, a customer may be able to access an object at the destination storage tier even if fewer than all segments of the object are transferred in connection with one of the disclosed processes, since it may be the case that some segments of that object already exist at the destination storage tier. Thus, selection of an object for transfer by a customer may simply mean, in some cases, that the customer desires storage of the selected object at the destination storage site, and in order to enable such storage, it may be the case that less than the entire object will be transferred, using a disclosed process, from the source storage site to the destination storage site.

D. General Aspects of Example Tiering Operations and Algorithms

Following is a discussion of some aspects of an example cold storage tier, referred to as ECO_TIER, including a process for transferring data, such as one or more objects, from active tier to ECO_TIER. In general, some embodiments may operate to place segments necessary to represent the transferred objects in the desired tier, but without creating duplicates of the objects themselves in that tier. As well, such embodiments may also move metadata for those objects into the appropriate tracking bucket, that is, a cold bucket in the active tier.

Figure 2:
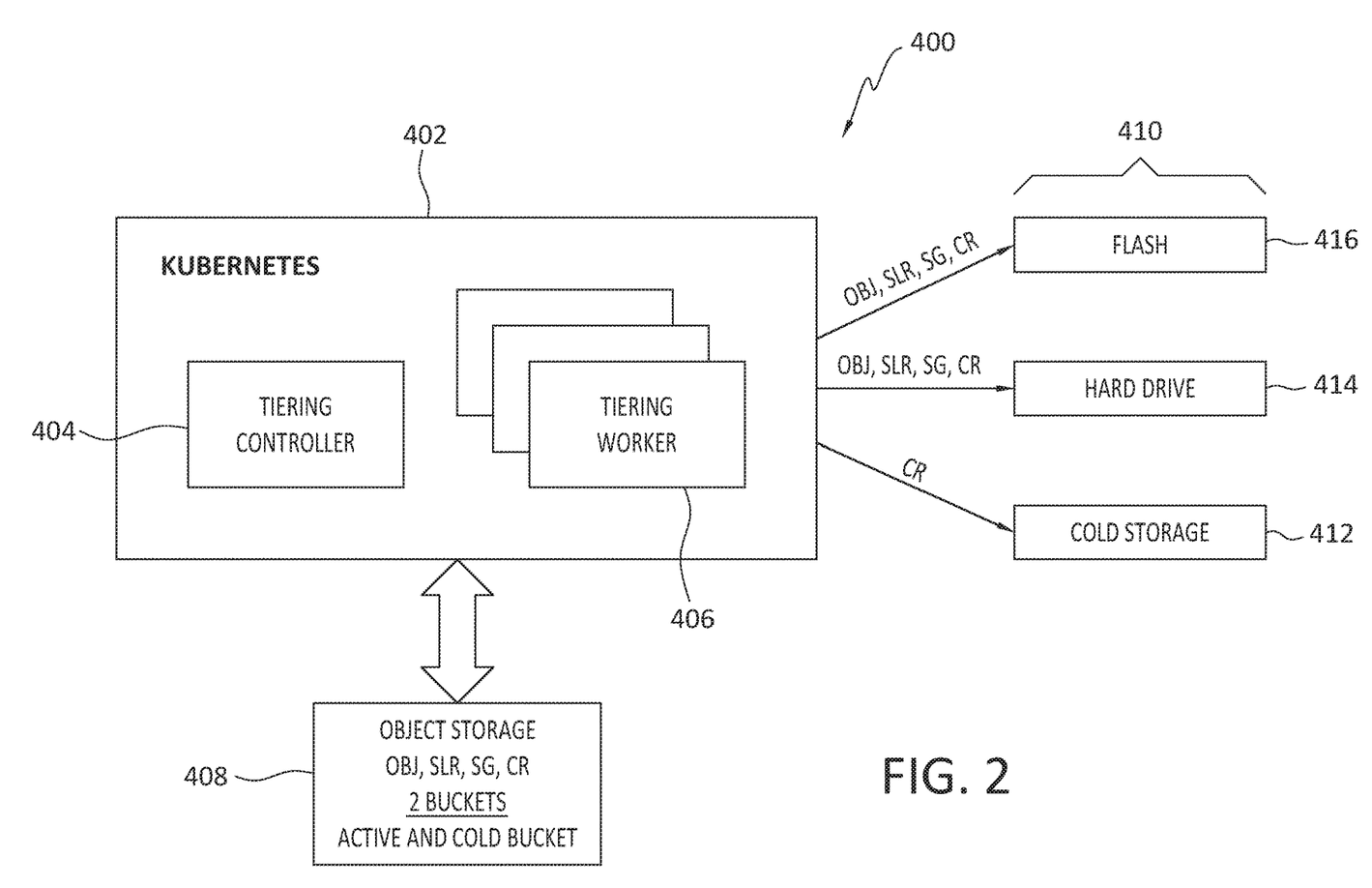
FIG. 2 discloses aspects of an example microservice architecture for data tiering.

With particular reference now to FIG. 2, an example architecture 400 may include a container management environment 402, such as Kubernetes for example, that includes a controller microservice 404, which may also be referred to as a 'tiering controller.' Note that in FIG. 2, 'OBJ' is an object, 'SLR' is a slice recipe, 'SG' is a similarity group, and 'CR' is a compression region.

The controller microservice 404 may analyze the amount of data to be transferred, and may also determine how many worker nodes 406, also referred to as 'tiering worker's, are needed to effect the data transfer. This may be accomplished by listing the objects in the active bucket and determining which objects are marked to move to ECO_TIER. The workers 406 may then be created, and the work may be partitioned across the workers 406 in a consistent manner to avoid reading objects from storage repeatedly.

The controller microservice 404 may break the objects down into slices, retrieve the respective similarity group ID associated with each, and then divide the similarity groups involved in the transfer across the worker nodes 406 evenly. Then as the controller microservice 404 processes object recipes and slice recipes, each slice recipe may be assigned to the worker 406 that is responsible for the similarity group associated with the slice recipe. Then the worker 406 may process similarity groups and slice recipes in batches efficiently to determine which segments should be read from the source tier, such as an active tier 408, and stored in the target tier 410, such as a cold tier 412, hard drive 414, and/or flash storage 416 for example. In the example of FIG. 2, the active tier 408 may take the form of object storage and may include two buckets, namely, an active bucket, and a cold bucket. As indicated in the example of FIG. 2, some embodiments provide that only a compression region is stored in the cold tier 412, while objects, compression regions, similarity groups, and slice recipes may be stored in other destinations such as the flash storage 416 and/or hard drive 414. In some embodiments (see, e.g., FIG. 3), objects, slices (SL), and similarity groups may be transferred from an active bucket to a cold bucket, and/or from a cold bucket to an active bucket.

Determination of the segments to be read from the active tier 408 may be accomplished, for example, by checking if the similarity groups already exist in the cold bucket. If a similarity group does not exist, a new similarity group may be created in the cold bucket. If the similarity group does exist, the worker 406 may check the respective fingerprints of the slice recipes against the similarity group to determine which segments need to be added to the ECO_TIER. If there are missing fingerprints in the similarity group metadata, the worker 406 may read, from the active tier, the segments corresponding to the fingerprints, and then create a new compression region for those segments in the cold tier.

Finally, all metadata structures associated with the object that was, or will be, transferred from the active tier 408 to a destination tier 410 such as the cold tier 412, are transferred from the active bucket to a fast-access bucket, such as the cold bucket, to support listing operations and other tasks such as cleaning and verification, as disclosed elsewhere herein. By way of comparison, if these operations were implemented in a more nave, streaming manner, it might be necessary to read similarity groups and compression regions repeatedly, which would result in a slower and inefficient process.

Note that metadata, as used herein, embraces, but is not limited to, any information relating to data of any type or structure. Example metadata may include, for example, time stamps such as object creation timestamp, object modification timestamp, object storage timestamps, and object restoration timestamp, identity of the object owner, identity of the application that created the data, and the type and size of the object.

Attention is now directed to a discussion of some aspects of an example cold storage tier, referred to as ECO_TIER, including a process for restoring data, such as one or more objects, from ECO_TIER to an active tier. In some embodiments, the algorithm used to restore objects from the ECO_TIER to the active tier may work in a similar, or the same, way as transferring the objects from active to ECO_TIER, except that the active tier is the destination in this restore scenario.

In the restore scenario, a controller microservice may be employed with one or more workers that are created based on considerations such as the amount of data to be transferred. The objects in the cold bucket may be listed, such as in response to a user command for example, to determine which objects are marked to move to from ECO_TIER to the active tier, and the data transfer work may then distributed among the workers.

The workers may break the objects to be transferred down into slices, retrieve the similarity group ID associated with each slice, and check if the similarity group already exists in the active bucket. If the similarity group does not exist, a new similarity group may be created in the active bucket. If the similarity group does exist, a worker may checks the respective fingerprints of the slice recipes against the similarity group to determine which segments of the object need to be added to the active tier. If there are missing fingerprints in the similarity group metadata, the worker may read the segments corresponding to the fingerprints from the ECO_TIER and create a new compression region in the active bucket. Afterwards, all other structures associated with the object may be transferred from the cold bucket to the active bucket, completing the restore.

One alternative to the restore approach just described is a temporary restore to ECO_TIER. In the context of a cloud storage environment that introduces retrieval delays on cold storage, such as AWS Glacier and Deep Archive for example, there may be at least two different ways to restore data. One way is to completely restore the data from cold tier to active as described previously. Another way is to perform a temporary restore, where the objects in cold storage are temporarily copied to active tier and deleted at a later point based on an expiration setting and/or other criteria.

In the case of a temporary restore to the active tier, the compression region objects may be temporarily copied to a "temporarily active" bucket in the active tier, giving the user access, at least temporarily, to the full object as needed. Thus, copies of the object may exist, during the temporary timeframe, both in the cold tier and in the active tier. When the user lists actively accessible objects, the user would see both the objects in the active bucket and those in the temporarily active bucket. The other structures related to the object that exist in the cold bucket in active tier may also be temporarily copied to the temporarily active bucket in active tier.

All objects copied to the temporarily active bucket may have a lifecycle policy, which may be user-defined, applied to them based on the expiration set when initiating the temporary restore. When the expiration time is reached, all structures copied to the temporarily active bucket that are associated with the expiring object may be deleted from the temporarily active bucket, leaving only the metadata present in the cold bucket in active tier and the original compression region objects still present in ECO_TIER. In a scenario where two or more objects are temporarily restored and their restore windows overlap, they may both reference the same compression region. If the objects all reference the same compression region, the expiration time for the compression region is updated to the expiration time of the last expiring object.

E1. Example Methods—Tiering From Active Tier to Cold Tier

Figure 3:
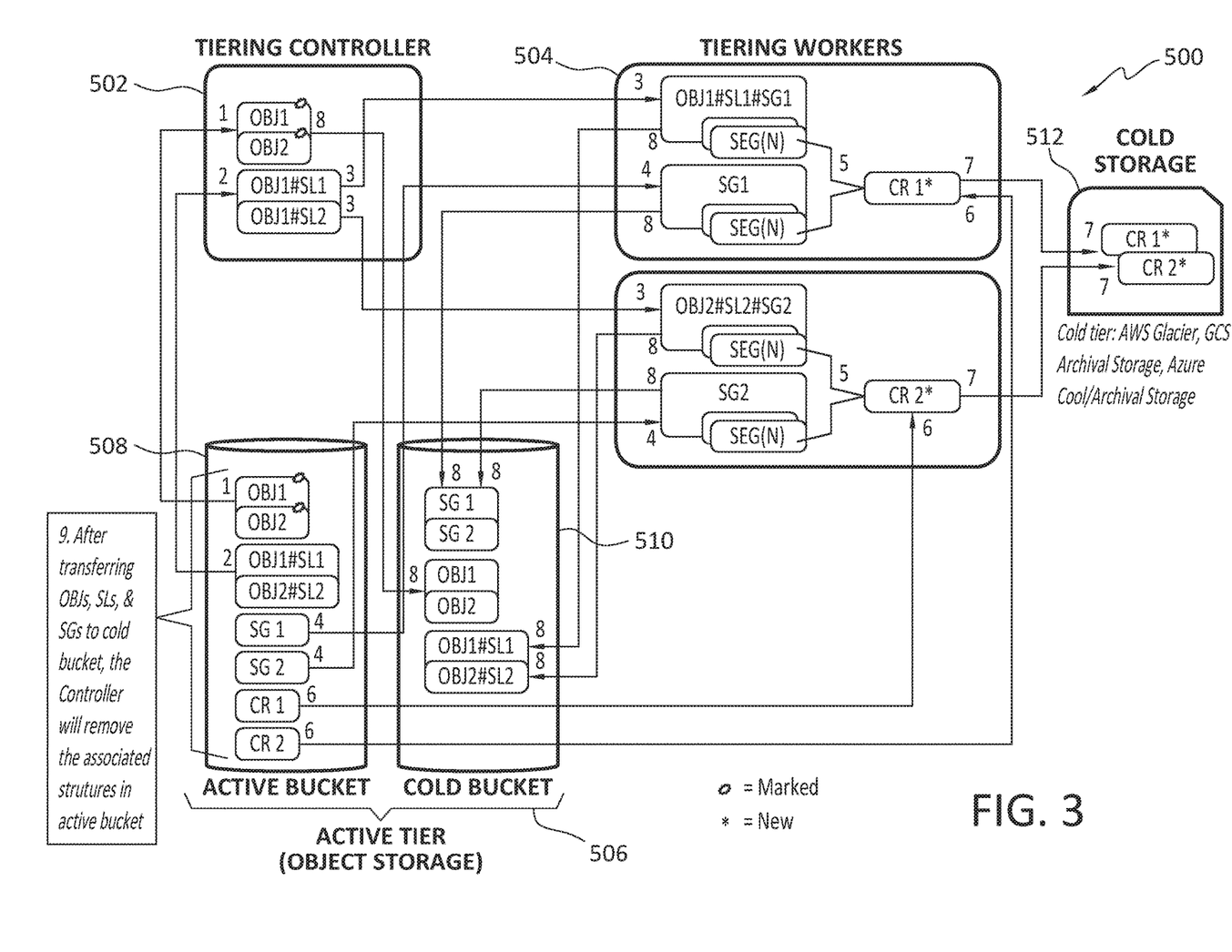
FIG. 3 discloses aspects of an example architecture and associated processes.

With attention now to FIG. 3, details are provided concerning some example methods for data tiering. As noted there, tiering methods may be implemented in an environment or architecture 500 that comprises, for example, a tiering controller 502 which may take the form of a controller microservice, one or more tiering workers or simply 'workers' 504, an active tier 506 that comprises an active bucket 508 and a cold bucket 510, and a cold tier 512, which may also be referred to as cold storage or ECO_TIER.

Attention is directed first to an example method for transferring data from an active tier to a cold tier such as ECO_TIER, and see also the FIG. 2 discussion concerning object recipes (OBJ), slice recipes (SLR), similarity groups (SG), and compression regions (CR). Initially, a tiering controller 502, implemented as a controller microservice, may create a tiering worker IP channel map that sets the worker IP address as the key, and the values corresponding to a channel, or queue, of slice recipe object attributes. The tiering controller 502 may notify each worker 504 to start the next phase. At this point, the tiering controller 502 may start the process to fill up the worker IP channel map with slice recipe object attributes. Thus, the tiering controller 502 may retrieve (1) a list of object recipes from object storage and may check to see which object recipes are selected, such as by a user, to be moved to cold tier. If the tiering controller 502 finds the object recipe marked 'transfer to cold tier,' the object recipe is appended to the object recipe channel of the tiering controller 502.

Concurrently, the tiering controller 502 may retrieve the object recipe from the tiering controller 502 object recipe channel. For each object recipe, the tiering controller 502 may obtain (2) the object structure from the active bucket 508 in active tier 506, based on the object recipe name. Each object structure may hold an attribute ObjID that uniquely identifies the associated object. Given the ObjID, the tiering controller 502 may retrieve a list of slice recipes that correspond to the object identified by ObjID. For each slice recipe, the tiering controller 502 determines the corresponding similarity group ID, which is part of the name of the slice recipe. The similarity group ID may be used to determine which worker 504 to send the slice recipe to. An index to the desired worker in the worker IP channel map may be calculated by taking the similarity group ID modded by the number of workers 504 in the Worker IP channel, where 'modded' refers to performance of the modulus operation. After determining the desired worker 504, the slice recipe is added to the slice recipe object attribute channel of that worker. Other mechanisms to determine the assignment of similarity groups to workers are possible including evenly splitting the range of possible similarity group ID values across the number of workers.

Once the worker 504 begins the "Record Slice Recipe Names" phase, the tiering controller 502 will send (3) the list of slice recipes to one of the workers 504 based on their assigned similarity group. After the worker 504 finishes processing the list of object recipes and slice recipes, the tiering controller 502 sends the next phase to the worker 504. The worker 504 starts recording the slice recipe names that were sent from the tiering controller 502 via a remote procedure call (RPC).

The worker 504 retrieves the list of slice recipes from the tiering controller 502. For each slice recipe, the worker 504 may retrieve the Deduplication Domain Identifier (DDID), which may be employed in multi-tenancy environments involving multiple users, based on the slice recipe name. The worker 504 may obtain the similarity group ID (SgID) from the slice recipe name. The worker 504 may then store these SgID and the DDID values in a data structure called SgIdAndDdid. The worker 504 may create a channel and append the data structure that stores the SgldAndDdid and the list of slice recipes. Concurrently, the worker 504 may check if the SgID exists in the cold bucket 510 in active tier 506. A similarity group may exist in the cold bucket 510 if similar data has already been stored in the ECO_TIER. If the similarity group exists in the cold bucket 510, the worker 504 will retrieve (4) the similarity group from the cold bucket 510 in active tier 506 based on similarity group ID and DDID. If the similarity group does not exist in the cold bucket 510, a new similarity group may be created in the cold bucket 510.

Using the similarity group from the cold bucket 510, the worker 504 may check the fingerprints of the slice recipes against the fingerprints in the similarity group to determine which segments need to be added to the cold tier 512 and which are already present in the cold tier 512. If the similarity group is missing fingerprints, the worker 504 may read the segments corresponding to the fingerprints from the active tier and create (5) a new compression region in the cold bucket. The similarity group may then be updated to include the fingerprints of the segments in the new compression region.

In order to create a new compression region due to missing fingerprint(s) from the similarity group, the worker 504 may read the corresponding similarity group from the active bucket 508 so that the worker 504 knows which compression region(s) to read in the active bucket 508 in active tier 506 and form (6) the proper compression region. The worker 504 may then write (7) the newly formed compression region to cold tier 512.

After the worker 504 has finished writing (7) the new compression regions to the appropriate tiers, the worker 504 may update and transfer the similarity groups and slice recipes to the cold bucket 510 in the active tier 506. Once the worker 504 finishes transferring and updating data to the active tier 506, the worker 504 notifies the tiering controller 502 that its task is complete. Finally, the tiering controller 502 may transfer (8) object recipes to the cold bucket 510. When the tiering controller 502 and worker 504 finish transferring their object recipes, slice recipes, and similarity groups from the active bucket 508 to the cold bucket 510, the tiering controller 502 may remove (9) the object recipes, slice recipes and similarity groups from the active bucket 508, thus completing the ECO_TIER tasks.

To this point, processes have been described that are concerned with how to move the appropriate data structures to the cold tier 512. However, even after those data structures have been moved, all of the segments are still in the active tier 506 as well. Thus, in at least some embodiments, a separate garbage collection process, which may be implemented by the garbage collection microservice 106, may run periodically to release unreferenced structures in the active tier 506 so as to complete the tiering operation. Unreferenced structures may include, for example, segments that are no longer referenced by object recipes in the active bucket 508.

E2. Example Methods—Restoring From Cold Tier to Active Tier

With continued reference to FIG. 3, details are now provided concerning a method for restoring data from a cold tier 512 such as the ECO_TIER to an active tier 506. Except for the fact that the destination in the restore process is the active tier 506, the restore process may be similar or identical to the tiering process described above.

The first part of the example restore process may be the same as part (1) of the tiering process except that in the restore process, the tiering controller 502 may retrieve a list of object recipes from the cold bucket 510 in the active tier 506 and check to see which object recipes are selected to move to the active tier from the cold tier 512. If the tiering controller 502 finds the object recipe marked 'transfer to active tier,' the object recipe may appended to the object recipe channel of the tiering controller 502.

Next, and similar to part (2) of the tiering process, the tiering controller 502 may concurrently retrieve the object recipe from the tiering controller 502 object recipe channel. For each object recipe, the tiering controller 502 gets the object structure from the cold bucket 510 in active storage 506 based on the object recipe name. Each object structure may hold an attribute ObjID that uniquely identifies the associated object. Given the ObjID, the tiering controller 502 may retrieve a list of slice recipes that correspond to the object identified by ObjID. The similarity group ID in the slice recipe name may be used to determine which worker 504 to send the slice recipe to. An index to the desired worker in the worker IP channel map may be calculated by taking the similarity group ID modded by the number of workers 504 in the Worker IP channel. After determining the desired worker 504, the slice recipe may be added to the slice recipe object attribute channel of that worker. The restore process may next proceed in the same way as part (3) of the tiering process.

The next part of the restore process may be the same as part (4) of the tiering process, except that in the restore process, the worker 504 may check if the similarity group ID exists in the active bucket 508 in the active tier 506. If the similarity group exists in the active bucket 508, the worker 504 may retrieve the similarity group from the active bucket 508 based on the similarity group ID and the DDID. If the similarity group does not exist in the active bucket 508, the worker 504 may create a new similarity group in the active bucket 508.

Next, given the similarity group from the active bucket 508, the worker 504 may check the fingerprints of the slice recipes against the fingerprints in the similarity group to determine which segments need to be added to the active tier 506. If there are missing fingerprints in the similarity group, the worker 504 may read the segments corresponding to the fingerprints from the cold tier 512 and create a new compression region in the active bucket 508 of the active tier 506. Except as noted, this part of the restore process may be the same as part (5) of the tiering process.

Creation of a compression region as part of the restore process may be similar to part (6) of the tiering process, except as noted in the following. In order to create a new compression region due to missing fingerprint(s) from the similarity group metadata, the worker 504 may need to read the similarity group from the cold bucket 510 so the worker 504 knows which compression regions to read in the cold tier 512, and form the proper compression region. Subsequently, the worker 504 may write the newly formed compression region to the active tier 506.

After the compression region is created, the restore process may proceed in the same way as part (7) of the tiering, with exceptions as follows. Once the worker(s) 504 finish writing the new compression regions to the appropriate tiers, the restore process may proceed similarly to part (8) of the tiering process, except that the worker 504 may update and transfer the similarity groups and slice recipes to the active bucket 508 in the active tier 506. Once the worker 504 finishes transferring and updating data to the cold tier 512, the worker 504 may notify the tiering controller 502 that the worker 504 task has been completed. The tiering controller 502 may then transfer the object recipe(s) to the active bucket 508.

Finally, and similar to part (9) of the tiering process except as noted in the following, after the tiering controller 502 and worker 504 finish transferring their object recipes, slice recipes, and similarity groups from the cold bucket 510 to the active bucket 508, the tiering controller 502 may remove the object recipes, slice recipes, and similarity groups from the cold bucket 510, thus completing the tasks to restore from the cold tier 512 to the active tier 506. A garbage collection process, as described earlier, may run periodically to release unreferenced data structures from the cold tier 512 such as, for example, segments that are not referenced by an object recipes in the cold bucket 510.

F. Further Example Embodiments

Following are some further example embodiments of the invention. These are presented only by way of example and are not intended to limit the scope of the invention in any way.

Embodiment 1. A method, comprising: identifying objects that each include one or more segments to be transferred from a source storage tier to a target storage tier; determining a total amount of data to be transferred; using a tiering controller to create worker nodes operable to transfer the segments to the target storage tier, wherein a number of worker nodes created is based on the amount of data; transferring, from the source storage tier to the target storage tier, only those segments of the objects not already present in the target storage tier, and the transferring of the segments is performed by the worker nodes; and for each of the objects, placing metadata associated with that object in a bucket.

Embodiment 2. The method as recited in embodiment 1, wherein the tiering controller and the workers comprise respective microservices operating as part of a scalable container orchestration system.

Embodiment 3. The method as recited in any of embodiments 1-2, wherein the workers identify the segments that are to be transferred.

Embodiment 4. The method as recited in any of embodiments 1-3, wherein the segments are identified based on a comparison of fingerprints of a similarity group with fingerprints included in a slice recipe.

Embodiment 5. The method as recited in any of embodiments 1-4, wherein identification of the objects is based on receipt of user input designating those objects.

Embodiment 6. The method as recited in any of embodiments 1-5, wherein one or more of the segments are stored only temporarily at the target storage tier, and are automatically removed from the target storage tier as a result of satisfaction of a criterion.

Embodiment 7. The method as recited in any of embodiments 1-6, further comprising performing a garbage collection process that periodically releases any unreferenced structures in the active tier.

Embodiment 8. The method as recited in any of embodiments 1-7, wherein the bucket is a cold bucket in the source storage tier, and the source storage tier also comprises an active bucket that holds copies of objects that are in the source storage tier, and the source storage tier comprises an active tier, and the target storage tier comprises a cold tier, and the active tier provides relatively faster access to objects stored in the active tier than the target tier provides to objects stored in the target tier.

Embodiment 9. The method as recited in any of embodiments 1-6, wherein the source storage tier comprises a cold tier, and the target storage tier comprises an active tier.

Embodiment 10. The method as recited in any of embodiments 1-9, wherein transferring the segments to the target storage tier comprises creating a compression region in the target storage tier that includes the segments.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
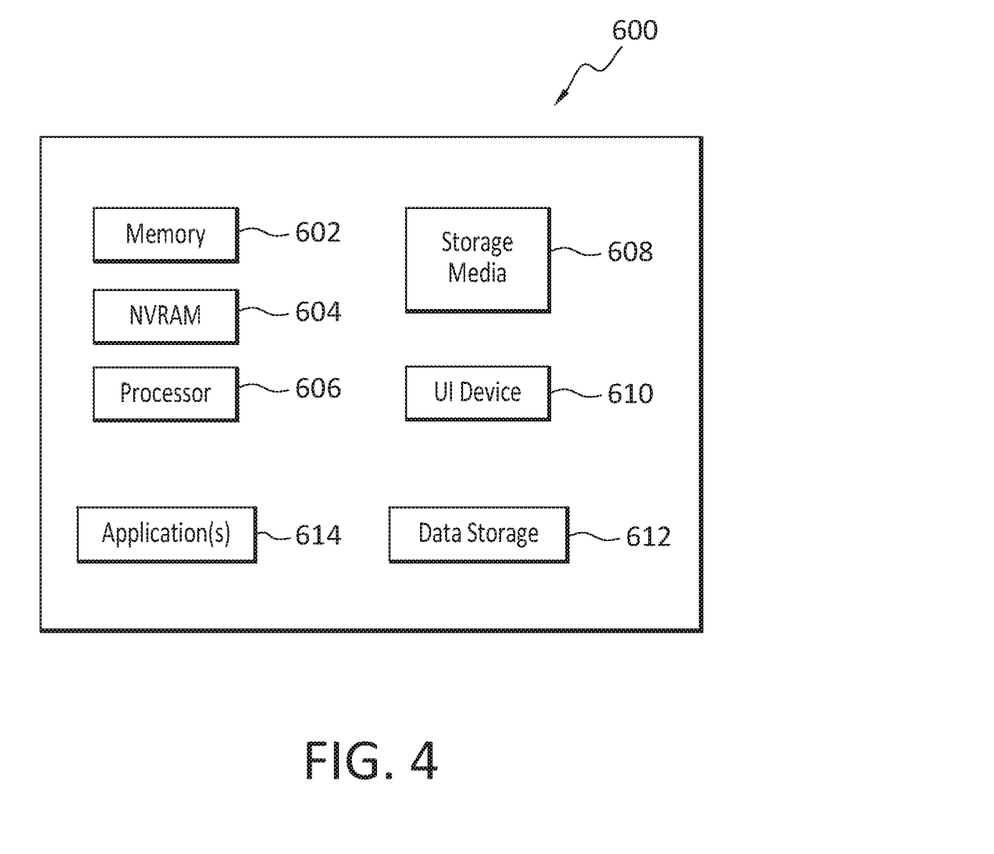
FIG. 4 discloses aspects of an example computing entity.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 4.

In the example of FIG. 4, the physical computing device 600 includes a memory 602 which may include one, some, or all, of random access memory (RAM), non-volatile memory such as non-volatile random access memory (NVRAM) 604, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   identifying objects that each include one or more segments to be transferred from a source storage tier to a target storage tier, wherein the source storage tier comprises an active bucket for storing the one or more segments, the source storage tier further comprises a cold bucket, and the target storage tier comprises an active tier and a cold tier, which provides slower access to objects stored in the cold tier than the active tier provides to objects stored in the active tier;
   determining, based on the objects identified, an amount of data to be transferred;
   using a tiering controller to create worker nodes operable to transfer the segments to the target storage tier;
   partitioning the objects across the workers, wherein the objects are partitioned across the workers to avoid repeated readout of the objects from storage;
   transferring, from the source storage tier to the target storage tier, only those segments of the objects not already present in the target storage tier as a compression region in the target storage tier, and the transferring of the segments is performed by the worker nodes; and placing metadata associated with objects, which are stored in the cold tier, in the cold bucket of the source storage tier.

2. The method as recited in claim 1, wherein the tiering controller and the workers comprise respective microservices operating as part of a scalable container orchestration system.

3. The method as recited in claim 1, wherein the workers identify the segments that are to be transferred.

4. The method as recited in claim 3, wherein the segments are identified based on a comparison of fingerprints of a similarity group with fingerprints included in a slice recipe.

5. The method as recited in claim 1, wherein identification of the objects is based on receipt of user input designating those objects.

6. The method as recited in claim 1, further comprising performing a garbage collection process that periodically releases any unreferenced structures in the active tier.

7. A non-transitory storage medium having stored therein instructions that are executable by one or more hardware processors to perform operations comprising:

identifying objects that each include one or more segments to be transferred from a source storage tier to a target storage tier, wherein the source storage tier comprises an active bucket for storing the one or more segments, the source storage tier further comprises a cold bucket, and the target storage tier comprises an active tier and a cold tier, which provides slower access to objects stored in the cold tier than the active tier provides to objects stored in the active tier;

determining, based on the objects identified, an amount of data to be transferred;

using a tiering controller to create worker nodes operable to transfer the segments to the target storage tier;

partitioning the objects across the workers, wherein the objects are partitioned across the workers to avoid repeated readout of the objects from storage;

transferring, from the source storage tier to the target storage tier, only those segments of the objects not already present in the target storage tier as a compression region in the target storage tier, and the transferring of the segments is performed by the worker nodes; and placing metadata associated with objects, which are stored in the cold tier, in the cold bucket of the source storage tier.

8. The non-transitory storage medium as recited in claim 7, wherein the tiering controller and the workers comprise respective microservices operating as part of a scalable container orchestration system.

9. The non-transitory storage medium as recited in claim 7, wherein the workers identify the segments that are to be transferred.

10. The non-transitory storage medium as recited in claim 9, wherein the segments are identified based on a comparison of fingerprints of a similarity group with fingerprints included in a slice recipe.

11. The non-transitory storage medium as recited in claim 7, wherein identification of the objects is based on receipt of user input designating those objects.

12. The non-transitory storage medium as recited in claim 7, wherein the operations further comprise performing a garbage collection process that periodically releases any unreferenced structures in the active tier.

* * * * *